Feb. 5, 1952  E. L. HOLMGREN  2,584,208
APPARATUS FOR WINDING AND PRODUCING COILS
Filed Jan. 3, 1950  2 SHEETS—SHEET 1

INVENTOR.
Eric L. Holmgren.
BY Frank C. Korman
ATTORNEY

Patented Feb. 5, 1952

2,584,208

UNITED STATES PATENT OFFICE 2,584,208

APPARATUS FOR WINDING AND PRODUCING COILS

Eric L. Holmgren, Bay City, Mich., assignor to Kuhlman Electric Co., Bay City, Mich.

Application January 3, 1950, Serial No. 136,579

4 Claims. (Cl. 18—13)

The present invention relates to a method and apparatus for winding and producing electrical coils and more particularly for making coils for use in dry-type electrical distribution transformers.

One object is to provide a method and apparatus for producing electrical coils which are particularly adapted for use in dry-type transformers, and the invention contemplates the application of a coating of plastic material to the wire either bare or insulated as it is being coiled upon a form or mandrel, whereby the plastic will flow to fill the interstices in the coil and eliminate air voids between the convolutions of the wire.

Another object is to provide a method and apparatus for making electrical coils particularly adapted for use in dry-type transformers which are subjected to high temperature and severe weather conditions by applying a silastic paste or similar material to the wire during winding of the coil in such a manner that the paste will fill the spaces between the convolutions of the wire to form a homogeneous insulating block with the wire embedded and completely encased therein.

Another object is to provide a method and apparatus for making coils for electrical transformers of the dry-type in which entrapped air between the turns of the coil is expelled during the winding process. The application of a coating of silastic material to the wire performing the function of expelling the air and simultaneously filling the spaces between the coil convolutions, so that after the completed coil is cured and vulcanized, the coil will be completely encased in an insulating block with the turns of the coil properly spaced and insulated one from the other.

Another object is to provide a method and apparatus for winding electric transformer coils in which a silastic paste of suitable consistency is applied to the wire by extruding a coating thereon as the wire is fed to the coil form or mandrel, so that the coating of the different coil convolutions will be bonded together to form homogeneous structure completely devoid of air and gas pockets which at high temperatures cause considerable damage to electrical transformers of the dry type.

Another object is to provide a method and apparatus for winding electrical transformer coils by applying a silastic paste to the wire by extrusion as the wire is fed to the coil form or mandrel of a coil-winding machine, and to provide means for controlling the movement of the extrusion mechanism so that the coil turns will be properly spaced.

Another object of the invention is to form a homogeneous structure completely devoid of air and gas pockets and which has a high thermal capacity for the efficient transmission and dissipation of heat to the external surfaces of the coil, thereby insuring minimum hot spot temperatures within the coil winding.

Another object is to provide an apparatus and method for making transformer coils in which the wire is passed through an extruding head so as to extrude a coating of silastic paste thereon before it reaches the coil form, and to provide means for feeding the silastic to the extruding head under constant pressure.

Another object is to provide a method and apparatus for winding and producing transformer coils in which the silastic paste is applied to the wire before it reaches the winding form or mandrel by extruding the paste under pressure, which paste is fed to the extruding head from a cartridge contained in a cylinder having a pressure operated follower.

Another object is to provide a method and apparatus for extruding a coating of silastic paste continuously on the wire as it is wound on the coil form of a winding machine, and to provide means for moving the extruding head so that it will traverse the coil form or mandrel at various rates of speed and thus space the convolutions of the coil properly depending upon the particular size or gauge of wire employed.

Another object is to provide an apparatus for winding transformer coils and extruding a coating of silastic paste on the wire as it is being wound, which includes an extruding head through which the wire passes during the movement to the coil form and to provide means for changing the traversing speed of the extruding head to space the coil convolutions various distances when using different sizes or gauge of wire.

Other objects and advantages of the invention will become apparent during the course of the following description of the accompanying drawings wherein.

Figure 4:
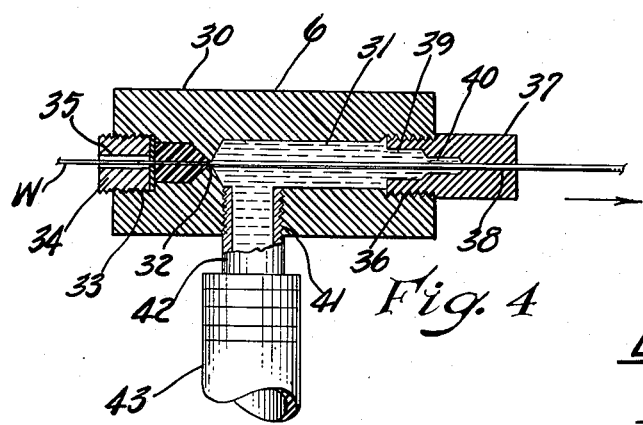
Figure 3:
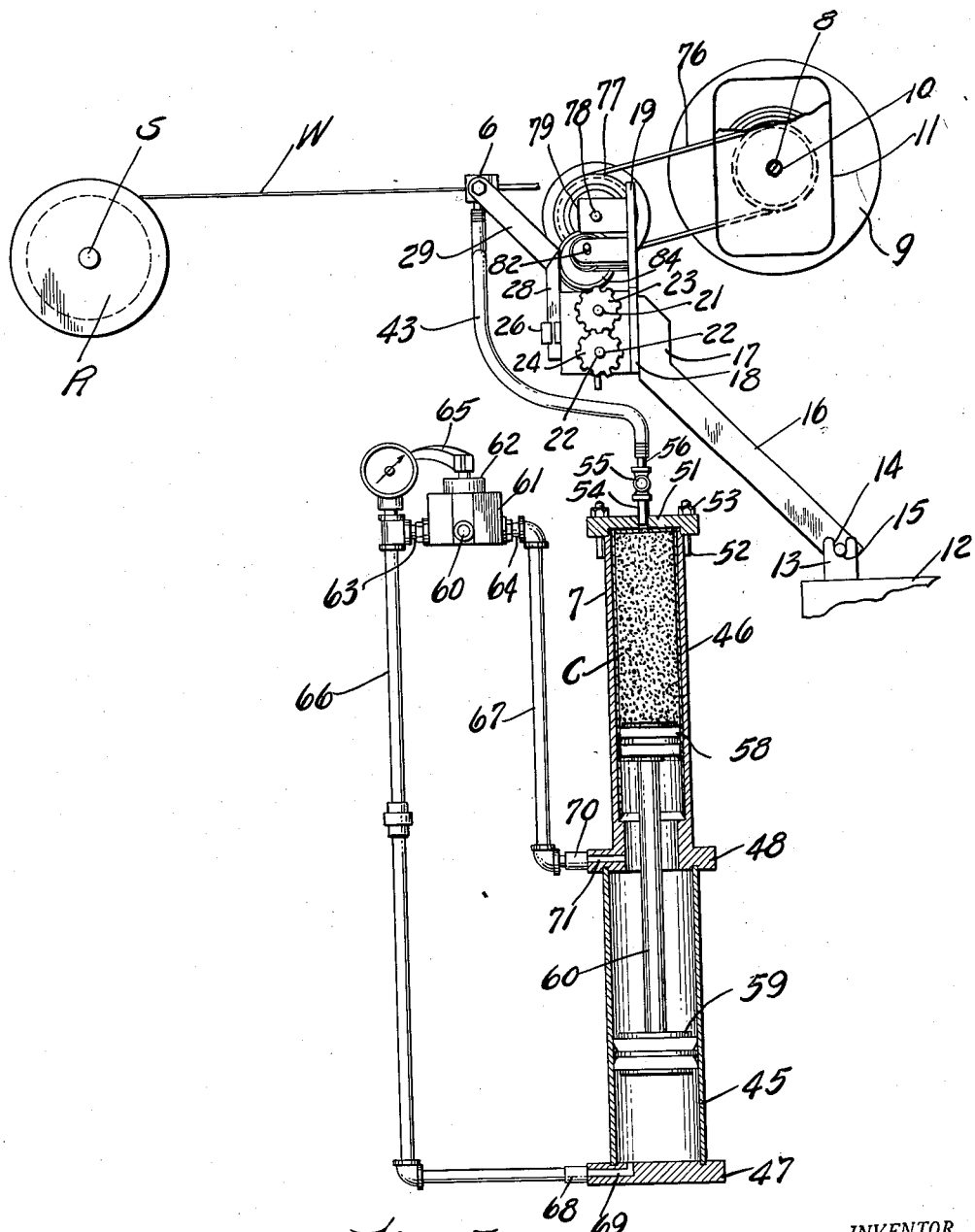

Figure 3 is an enlarged side-elevational view of the supporting mechanism for the extruder head, and showing the pressure operated follower cylinder in section to show various details of construction and the differential pistons therein for exerting extremely high pressure upon a cartridge of silastic paste placed in the upper end of the pressure operated follower cylinder, and Figure 4 is an enlarged, longitudinal cross-sectional view of the extruder head illustrating the manner in which the wire is coated with a silastic paste composition of suitable consistency during its travel to the winding form or mandrel of the coil winding apparatus.

In the drawings, and more in detail, there is shown for the purpose of convenience of illustration, a coil winding apparatus generally designated 5 having a traversing mechanism for guiding an extruder head generally designated 6, which extruder head is supplied with silastic paste of suitable consistency from a pressure reservoir generally designated 7.

The winding mechanism can be of conventional design and includes a shaft 8 having a stepped pulley 9 affixed to the end thereof. The shaft 8 which is adapted to pass through the opening 10 in the coil form 11 is supported between the spindles of a lathe, one of which is connected to a source of power such as a motor (not shown) to rotate the shaft 8 at a predetermined speed. Thus, when the coil form 11 is supported on the shaft 8, said form will be rotated in the usual manner.

Figure 2:
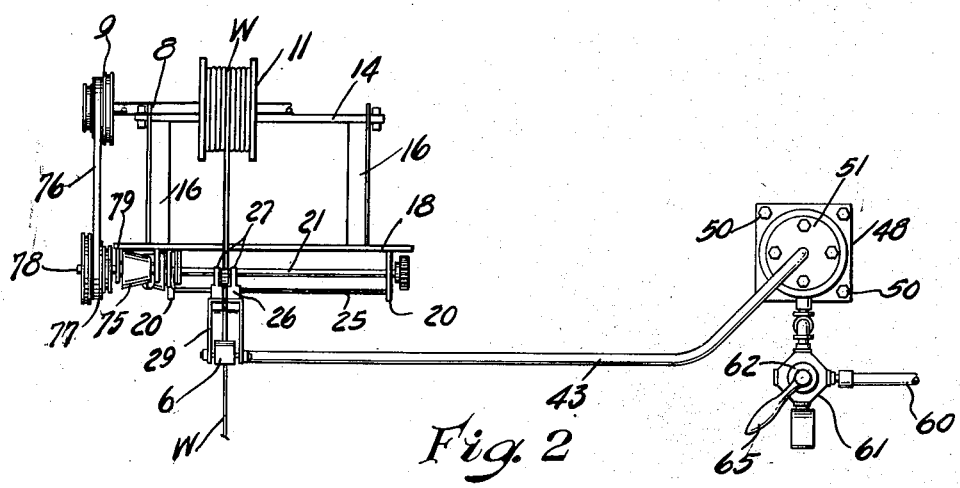
Figure 2 is a top-elevational view of the extruding mechanism showing the manner in which the same is supported to traverse the coil form, and also showing the manner in which the silastic paste is supplied to the extruder head by means of a pressure-operated follower.
Figure 1:
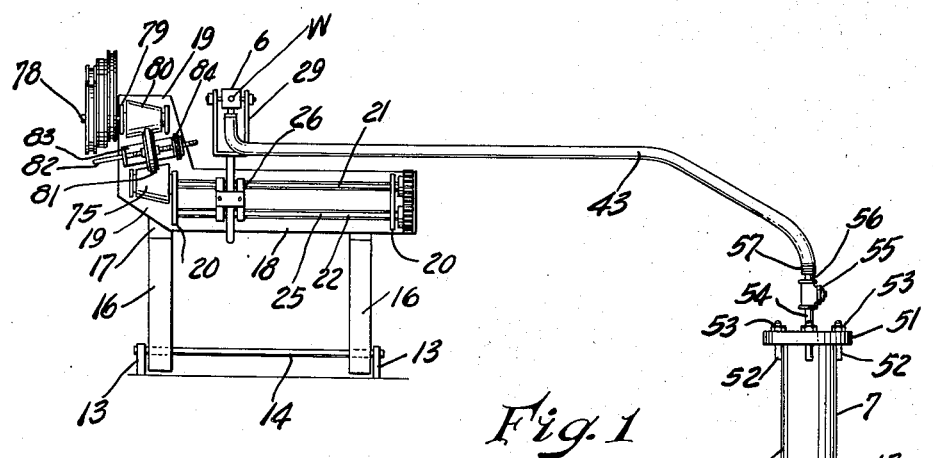
Figure 1 is a front-elevational view of the winding apparatus illustrating the manner in which the extruder head is movably mounted to traverse the length of the coil section being wound, and the manner of supplying silastic paste to said extruder head by a pressure-operated follower.

The bed of the lathe 12 upon which the shaft 8 is supported is provided with a pair of bearing supports 13, slotted as at 14 to accommodate a horizontal rod 15 (Figure 2). Mounted adjacent the ends of the rod 15 are upstanding bracket arms 16 and rod 15 securely joins said arms, these arms being angularly bent as at 17 and are welded or otherwise secured to a vertically disposed horizontally extending plate 18. One end of the plate 18 is formed with an extension 19 for supporting a variable speed drive mechanism.

Mounted adjacent each end of the plate 18 is a bearing bracket plate 20 having suitable bearing openings for accommodating right hand threaded shafts 21 and 22. Affixed to the ends of the shafts 21 and 22 is a pair of gears 23 and 24 which are arranged in intermeshing relation so that the shafts 21 and 22 will be driven in opposite directions. Also supported by the bearing brackets 20 and extending therebetween is a pair of vertically spaced guide rods 25 for supporting a slide 26 which is movably guided on the guide rods 25 and is provided with suitable projections as at 27 which engage the upper and lower threaded rods or lead screws 21 and 22.

Extending upwardly from the slide 26 is an arm 28 on the upper end of which is supported a U-shaped bracket 29 which is arranged to extend upwardly and outwardly in a direction away from the slide 26. Supported between the spaced ends of the U-shaped bracket 29 is the extruder head 6 which includes a body portion 30 having an enlarged bore 31 extending centrally thereof which terminates adjacent the entrance end in a reduced bore 32. The reduced bore enters an enlarged, internally threaded bore 33 for receiving a correspondingly threaded packing gland 34 having an opening 35 which is coaxial with the bores 31 and 32. Similarly, the opposite end of the bore 36 is internally threaded as at 35 for receiving one end of a correspondingly threaded plug 37 which is provided with a bore 38 equal to the gauge of the wire plus the thickness of the coating applied to the wire.

Stepped forming openings 39 and 40 are formed in the plug 37, and said openings are connected by angular wall surfaces to slightly compress the silastic paste and exert force thereon in a direction toward the axis of the wire W as it is fed through the extruder head 6. Extending transversely of the bore 31 is an internally threaded bore 41 into which is threaded a pipe nipple 42 for receiving one end of a flexible hose 43. The opposite end of the hose 43 is connected to the pressure reservoir 7 which includes a pair of superposed cylinders 45 and 46 which are connected together in axial alignment. The lower cylinder 45 is supported on a base 47 and has its end received in an annular recess therein, while the base 48 of the upper cylinder 46 is supported on the upper end of the cylinder 45 in a similar manner.

The bases 47 and 48 are connected together by clamping rods 49 which extend upwardly from the base 47 and pass through suitable openings in the base 48 for receiving clamping nuts 50. The upper end of the cylinder 46 is provided with a removable head 51 which is held in place by a series of bolts 52 which are secured to the cylinder 46 and arranged in circumferentially spaced relation so as to pass through correspondingly arranged openings in the head 51. Retaining nuts 53 are provided for removably holding the head 51 in place, and a threaded nipple 54 extends through the head 51 and is provided with a valve fitting 55 having a nipple 56 to which the flexible hose or pipe 43 is securely clamped by means of a hose clamp 57.

A removable cartridge C is mounted in the cylinder 46, the lower end being open to receive a follower piston 58, which is connected to a pressure piston 59 by means of a plunger rod 60. It will be noted that the bore of the lower cylinder 45 is slightly larger than the bore of the cylinder 46, so that sufficient extruding pressures can be obtained with moderate gas or fluid pressure in cylinder 45. The admission of pressure fluid such as air, gas or liquid to the lower end of the cylinder 45 places the contents of the cartridge C under a slightly greater presure by reason of the difference in the area of the pistons 58 and 59.

Pressure fluid from a suitable air, gas or liquid reservoir is supplied through a pipe 60 to a two-way valve 61 having a rotary plug 62 provided with suitable ports for communicating the inlet pipe 60 with opposed outlets 63 and 64, a handle 65 being provided for controlling the rotary plug valve 62 to selectively supply pressure fluid to pipes 66 and 67, the former being connected to a nipple 68 connected to the base 47 of the cylinder 45 in registry with an opening or duct 69 therein for admitting pressure fluid to the lower end of the cylinder 45. The pipe 67 is similarly connected to a nipple 70 threaded in the base 48 of the cylinder 46 in communication with a duct 71 therein to admit pressure fluid to the opposite end of the piston 59 and cause the follower piston 58 to be lowered when a filled cartridge C is inserted to replenish the supply of silastic material in the cylinder 46.

The silastic material or stock can be purchased in a cartridge C which is fitted into the cylinder 46 and is provided with an opening in the upper end in registry with the opening of the nipple 54. Thus, the cylinder 46 may be replenished by removing the head 51 and merely inserting the cartridge C. After the cartridge is inserted, the head 51 is replaced and secured in position by the retaining nuts 53.

The wire W is fed from a reel R supported on an uncoiling shaft S and passes through the extruder head 6 which is carried by the slide 26. The slide 26 is provided with a movable thread-engaging member (not shown) for alternately engaging the threads of the lead screws 21 and 22, and said thread-engaging member is adapted to be controlled by suitable reversing mechanism controlled by stops mounted in the path of the slide 26 in a well-known manner. In order to drive the lead screws 21 and 22, a cone pulley drum 75 is affixed to the end of the upper lead screw 21 and is adapted to be driven by the pulley 9 by means of a V-belt 76 which is trained over a stepped V-pulley 77 supported on a suitable shaft 78 and mounted in bearing brackets 79 carried by the upper end of the extension 19 of the horizontal plate 18.

Mounted on the shaft 78 is a cone 80 which is adapted to be drivingly connected to the cone 75 by means of a friction wheel 81 which is mounted on a shaft 82 supported by a bracket 83 secured to the extension 19 of the horizontal plate 18. The shaft 82 is provided with a hand control 84 to move the friction disc 81 axially along the shaft 82 so that the speed of the lead screws 21 and 22 may be varied and rotated at a different speed ratio from the shaft 8. Thus, by adjusting the hand control 84, the friction disc 81 can be moved to a position to cause the slide 26 to traverse the axis of the coil form 11 and space the convolutions or turns of the coil a desired distance apart, depending upon the gauge wire employed.

Various silastic stocks are sold on the market for commercial purposes, and such stocks as silicone rubbers are described in French Patent 929,522, Rubber Age by P. C. Servais, volume 58, No. 5, pages 579 to 584 of 1946, India Rubber World by P. C. Servais, volume 114, No. 5, pages 659 to 662 of 1946, Industrial and Engineering Chemistry, November 1947, page 1410 by G. M. Konkle, R. Selfridge, and P. C. Servais, in addition to which there is silicone rubber and any other suitable material not necessarily belonging in this silicone group.

The invention contemplates the use of a silicone elastomer of paste-like consistency of one of the commercial types disclosed in the above literature, and said stock is placed in the cylinder 46 in its original cartridge C which is formed of rigid material so that the silicone rubber will be fed to the extruder head 6 by the piston 58 when pressure fluid is admitted to the lower end of the cylinder 45 from the pressure source (not shown) controlled by the valve 61.

Thus, the silicone rubber contained in cartridge C is placed under compression so that it will be fed continuously to the extruder head 6, and by regulating the valve 55 the amount of silicone rubber may be controlled so as to coat the wire W, which is either bare or insulated, with a layer of silicone rubber. The coated wire is then wound on the removable coil form 11 and the convolutions are controlled by the traversing movement imparted to the extruder head 6 by the lead screws 21 and 22.

After one layer has been wound on the coil form 11 suitable spacer sheets of silicone rubber, silicone rubber covered glass cloth, or any other material with the extruded paste capable of forming a voidless homogeneous mass, may be placed thereon, or if desired, the spacer members may be eliminated and the convolutions of the various layers wound one on top of the other.

In the event that spacing sheets are employed, the silastic paste will unite and fuse therewith after the coil has been completely wound and subjected to vulcanizing and curing temperatures.

When a coil of predetermined dimensions has been wound on the coil form 11, it is vulcanized at a suitable temperature, and then cured, the vulcanizing and curing temperatures depending upon the silastic stock employed.

The terminal ends of the coil can be provided with silicone rubber tubes so that upon vulcanizing and curing, the tubes will become fused with the silastic stock applied to the wire during winding. It will be found that the silastic layer material used for spacing the layers of the coil will also fuse with the extruded silastic paste on the wire and form an integral mass completely devoid of entrapped air or gas pockets.

A block of suitable heat resistant insulating material, such as porcelain, silicone glass fiber laminate or cured silastic, may be taped to the high voltage winding of the transformer for receiving the silastic tubes through which the lead wires protrude, and thus insulates the terminal ends of the coil. Silastic paste between the block and the coil silastic insulation and in the lead apertures solidifies when subjected to heat to form a solid homogeneous body of high insulating and mechanical strength.

While I have specified the use of silicone rubbers as being preferable due to its high heat and weather resisting properties, it is obvious that other thermo-setting plastic compositions may be used. The use of organosilicone elastomers such as silicone rubber provides a transformer which will withstand high temperatures caused by greater overloads for longer periods than is possible in the case of present day oil insulated types.

What I claim is:

1. In an apparatus for making transformer coils, a coiler mechanism having a drive shaft and a coiler form adapted to be rotated thereon, means for continuously feeding wire to said form to wind a coil of predetermined dimensions thereon, a traversing guide for guiding the layers of wire on said form, a pivotally mounted extruder head on said guide through which said wire passes during its travel to said form, means operable by said drive shaft for controlling the traversing guide, and means for feeding a silicone elastomer to said extruder head whereby a coating of said silicone elastomer will be applied to said wire to fill air voids between the turns and layers of said coil.

2. In an apparatus for making dry type transformer coils, a coiler mechanism having a drive shaft and a coil form rotated thereby, means for continuously feeding wire to said coil form, a frame rockably mounted on said coiler mechanism, a traverse slide movably supported by said frame, traverse screw and nut means for controlling the movement of said traverse slide, variable speed gearing drivingly connecting the drive shaft with said traverse screw and nut means, an extruder head rockably supported by said traverse slide having a wire passage through which said wire passes during feeding movement to said coil form, and means for feeding silastic paste to said extruder head of sufficient consistency to fill the interstices between the coil windings.

3. In an apparatus for making dry type transformer coils, a coiler mechanism having a drive shaft, and a coil form adapted to be rotated thereby, a frame rockably supported on said coiler mechanism, a traverse slide mounted on said frame, screw and nut drive means for said slide, variable speed gearing drivingly connecting said drive shaft with said screw and nut drive means, an extruder head supported on said slide through which said wire passes during its travel to said coil form, a follower cylinder adapted to contain silastic paste, a conduit connecting said cylinder with said extruder head to feed said paste to said wire, a follower piston in said cylinder to expel the contents thereof, a pressure cylinder mounted adjacent said follower cylinder having a piston operably connected to said follower piston, a pressure fluid source and means for alternately admitting pressure fluid to opposite ends of said pressure cylinder, said follower cylinder being provided with a removable cartridge containing silastic paste.

4. In an apparatus for making dry type transformer coils, a coiler mechanism having a drive shaft, and a coil form adapted to be rotated thereby, a frame rockably supported on said coiler mechanism, a traverse slide mounted on said frame, screw and nut drive means for said slide, variable speed gearing drivingly connecting said drive shaft with said screw and nut drive means, an extruder head supported on said slide through which said wire passes during its travel to said coil form, a follower cylinder adapted to contain silastic paste, a conduit connecting said cylinder with said extruder head to feed said paste to said wire, a follower piston in said cylinder to expel the contents thereof, a pressure cylinder mounted adjacent said follower cylinder having a piston operably connected to said follower piston, a pressure fluid source and means for alternately admitting pressure fluid to opposite ends of said pressure cylinder, said follower cylinder being provided with a removable cartridge containing silastic paste, the follower cylinder being of slightly smaller diameter than said pressure cylinder to increase the pressure force of the follower piston.

ERIC L. HOLMGREN.

REFERENCES CITED

The following references are of record in the file of this patent:

UNITED STATES PATENTS

| Number | Name | Date |
|---|---|---|
| 724,287 | Heilmann | Mar. 31, 1903 |
| 1,419,090 | Williams | June 6, 1922 |
| 1,519,522 | Weigel | Dec. 16, 1924 |
| 1,587,155 | Honan | June 1, 1926 |
| 1,633,620 | Alderfer | June 28, 1927 |
| 2,258,025 | Morris et al. | Oct. 7, 1941 |